(12) United States Patent
Khazaeli et al.

(10) Patent No.: US 11,799,154 B2
(45) Date of Patent: Oct. 24, 2023

(54) HYBRID ENERGY STORAGE DEVICE

(71) Applicant: Queen's University at Kingston, Kingston (CA)

(72) Inventors: Ali Khazaeli, Kingston (CA); Dominik Barz, Kingston (CA)

(73) Assignee: Queen's University at Kingston, Kingston (CA)

( * ) Notice: Subject to any disclaimer, the term of this patent is extended or adjusted under 35 U.S.C. 154(b) by 0 days.

(21) Appl. No.: 17/627,446

(22) PCT Filed: Jul. 15, 2020

(86) PCT No.: PCT/CA2020/050984
§ 371 (c)(1),
(2) Date: Jan. 14, 2022

(87) PCT Pub. No.: WO2021/007670
PCT Pub. Date: Jan. 21, 2021

(65) Prior Publication Data
US 2022/0263165 A1    Aug. 18, 2022

Related U.S. Application Data (60) Provisional application No. 62/874,723, filed on Jul. 16, 2019.

(51) Int. Cl.
*H01M 16/00* (2006.01)
*H01G 11/04* (2013.01)
(Continued)

(52) U.S. Cl.
CPC .......... *H01M 16/003* (2013.01); *H01G 11/04* (2013.01); *H01G 11/32* (2013.01);
(Continued)

(58) Field of Classification Search
CPC .. H01M 10/0418; H01M 10/38; H01M 4/625; H01M 4/663; H01M 16/003; H01G 11/04; H01G 11/32
See application file for complete search history.

(56) References Cited

U.S. PATENT DOCUMENTS

2011/0043968 A1    2/2011   Kim et al.
2013/0164636 A1*   6/2013   Hwang .................. H01G 11/24
                                                           429/207

(Continued)

FOREIGN PATENT DOCUMENTS

WO    WO2006/109909 A1    10/2006

OTHER PUBLICATIONS

International Search Report and Written Opinion for corresponding International Application No. PCT/CA2020/050984 filed on Jul. 15, 2020.

(Continued)

*Primary Examiner* — Karie O'Neill Apicella
(74) *Attorney, Agent, or Firm* — Stephen J. Scribner (57) ABSTRACT

A hybrid energy storage device has at least two half cells, wherein each half cell includes an electrode comprising an electrically conductive high surface area material incorporating an electrolyte comprising a dissolved species that can exist in more than two redox states, and at least one separator that separates the at least two half cells and allows transfer of selected charge carriers between the half cells. After an initial charging, a redox pair of one half cell is different from the redox pair of the other half cell. The hybrid energy storage device operates as a battery for low power applications, and as a supercapacitor for high power applications. The hybrid energy storage device may be flexible.

23 Claims, 10 Drawing Sheets

(51) Int. Cl.
*H01G 11/32* (2013.01)
*H01M 4/62* (2006.01)
*H01M 4/66* (2006.01)
*H01M 10/04* (2006.01)
*H01M 10/38* (2006.01)
*H01M 4/02* (2006.01)

(52) U.S. Cl.
CPC ........... *H01M 4/625* (2013.01); *H01M 4/663* (2013.01); *H01M 10/0418* (2013.01); *H01M 10/38* (2013.01); *H01M 2004/023* (2013.01); *H01M 2004/029* (2013.01); *H01M 2300/0011* (2013.01)

(56) References Cited

U.S. PATENT DOCUMENTS

| | | | |
|---|---|---|---|
| 2017/0194656 A1* | 7/2017 | Sinsabaugh | H01M 8/20 |
| 2017/0346125 A1 | 11/2017 | Hosobuchi et al. | |
| 2019/0103232 A1* | 4/2019 | Chai | H01G 11/86 |

OTHER PUBLICATIONS

Lee, J., et al., "Redox-electrolytes for non-flow electrochemical energy storage: A critical review and best practice" Prog. Mater. Sci., vol. 101, pp. 46-89, (2019).

Wang, Z., et al., "Effect of drying conditions on the structure of three-dimensional N-doped graphene and its electrochemical performance", RSC Advances, vol. 5, pp. 19838-19843, (2015).

Wu, L., et al., "Electrochemical evaluation methods of vanadium flow battery electrodes" Phys. Chem. Chem. Phys., vol. 19, pp. 14708-14717, (2017).

Xu, Y., et al., "Functionalized Graphene Hydrogel-Based High-Performance Supercapacitors", Adv. Mater., vol. 25, pp. 5779-5784, (2013).

Chen, L., et al., "Electrochemical supercapacitor with polymeric active electrolyte", J. Mater. Chem. A. vol. 2, pp. 10526-10531, (2014).

* cited by examiner

HYBRID ENERGY STORAGE DEVICE

This application is a 371 of International Application No. PCT/CA2020/050984, filed Jul. 15, 2020, and claims the benefit of the filing date of Application No. 62/874,723, filed Jul. 16, 2019, the contents of which are incorporated herein by reference in their entirety.

FIELD

The invention relates to energy storage devices. More specifically, the invention relates to a hybrid battery supercapacitor.

BACKGROUND

Batteries and supercapacitors are reliable and sustainable power sources for a multitude of mobile electronics devices ranging from personal electronic devices such as cell phones and laptop computers to (hybrid) electric vehicles. They are also considered as a key technology for portable and wearable electronics which require lightweight, flexible, and highly efficient energy storage systems. Batteries can store a high amount of specific energy. However, they have a relatively short cyclic durability and deliver electricity at rather low levels due to their intrinsically low power handling capabilities. In contrast to batteries, supercapacitors can provide high specific power with superior cyclic stability and efficiency. Many supercapacitors are based on carbon electrodes, including activated carbon, carbon nanotubes, carbide-derived carbon, onion-like carbon, and graphene-based materials. However, their application is limited due to the low energy storage capacity compared to that of the batteries and they generally suffer from a relatively high self-discharge rate.

In general, a hybrid battery supercapacitor has two different charge storage mechanisms, a supercapacitor mechanism with an electrical double layer and a battery mechanism with a faradaic reaction. Pseudo capacitors are not classified as hybrid battery supercapacitors since they employ only faradaic adsorption of ions in a surface decoration of the supercapacitive material and therefore behave like capacitors. Pseudocapacitive materials that have been reported in literature include $RuO_2$, $MnO_2$, $V_2O_5$, etc. Over the last decades, several hybrid battery supercapacitor systems have been introduced, but none of the previous devices is quick charging and able to offer long discharge time that meets current demand.

SUMMARY

According to one aspect of the invention there is provided a hybrid energy storage device, comprising: at least one cell; wherein the at least one cell comprises two half cells, wherein each half cell comprises: an electrode comprising an electrically conductive high surface area material and an electrolyte incorporated into the electrically conductive high surface area material, wherein the electrolyte comprises a dissolved species that can exist in more than two redox states; the energy storage device further comprising: at least one separator that electronically separates the at least two half cells and allows transfer of selected charge carriers between the half cells.

In various embodiments, each half cell has a redox pair of the dissolved species, and the redox pair of one electrode is different than the redox pair of the other electrode.

In one embodiment, the energy storage device is flexible.

In one embodiment, the electrically conductive high surface area material comprises graphene, graphene nanoplatelets, reduced graphene oxide (rGO), micro porous carbon, activated carbon, or a combination of two or more thereof.

In one embodiment, the dissolved species that can exist in more than two redox states is vanadium.

In one embodiment, the more than two redox states are vanadium (II), vanadium (III), vanadium (IV), and vanadium (V).

In one embodiment, the redox pair of the dissolved species associated with one electrode is V(IV)/V(V) and the redox pair associated with the other electrode is V(III)/V(IV).

In one embodiment, the redox pair of the dissolved species associated with one electrode is V(IV)/V(V) and the redox pair associated with the other electrode is V(II)/V(III).

In one embodiment, the redox pair of the dissolved species associated with one electrode is V(II)/V(III), and the redox pair associated with the other electrode is V(III)/V(IV).

In one embodiment, the at least one separator is an ion exchange membrane.

Another aspect of the invention relates to a method of storing energy, comprising using a hybrid energy storage device as described herein.

Another aspect of the invention relates to a method for preparing a hybrid energy storage device, comprising: providing at least one cell, wherein the at least one cell comprises two half cells; wherein each half cell comprises an electrode comprising an electrically conductive high surface area material and an electrolyte incorporated into the electrically conductive high surface area material, wherein the electrolyte comprises a dissolved species that can exist in more than two redox states; electronically separating the two half cells; wherein the at least one separator allows transfer of selected charge carriers between the half cells.

In one embodiment, the method comprises applying a suitable potential difference across the electrodes of the two half cells; wherein initially the electrodes of the two half cells have substantially the same complement of dissolved species and the potential difference establishes a different redox pair of the dissolved species in each of the two half cells.

In various embodiments, the method includes using an electrically conductive high surface area material comprising graphene, graphene nanoplatelets, reduced graphene oxide (rGO), micro porous carbon, activated carbon, or a combination of two or more thereof.

In one embodiment, the method comprises using vanadium for the dissolved species that can exist in more than two redox states.

In one embodiment of the method, the more than two redox states are vanadium (II), vanadium (III), vanadium (IV), and vanadium (V).

In one embodiment of the method, the redox pair of the dissolved species associated with one electrode is V(IV)/V(V) and the redox pair associated with the other electrode is V(III)/V(IV).

In one embodiment of the method, the redox pair of the dissolved species associated with one electrode is V(IV)/V(V) and the redox pair associated with the other electrode is V(II)/V(III).

In one embodiment of the method, the redox pair of the dissolved species associated with one electrode is V(II)/V(III), and the redox pair associated with the other electrode is V(III)/V(IV).

In one embodiment of the method, the at least one separator is an ion exchange membrane.

BRIEF DESCRIPTION OF THE DRAWINGS

For a better understanding of the invention and to show more clearly how it may be carried into effect, reference will now be made, by way of example, to the accompanying drawings, wherein.

DETAILED DESCRIPTION OF EMBODIMENTS

Hybrid battery supercapacitor power storage devices (also referred to herein as "hybrid energy storage devices" (HESDs)) described herein exhibit improved rapid-charge supercapacitor performance and improved slow discharge battery performance. Previous hybrid battery supercapacitors are different from embodiments described herein. For example, in most previous hybrid devices, pairs of half cells function such that one half cell is a battery and the other half cell is a supercapacitor. In this way, such prior devices neither provide a full battery nor a full supercapacitor at any one time, but rather they provide a half-battery and half-supercapacitor at all times.

In contrast, HESDs as described herein have pairs of half cells with substantially identical structure and function, and both half cells of a pair are capable of functioning like a battery, like a supercapacitor, or like a battery-supercapacitor having characteristics of both. Specifically, at low current densities (relatively lower power densities), a HESD behaves like a battery, providing electrical energy using a redox reaction of a selected chemical species. At high current densities, a HESD exhibits supercapacitor-like behavior. The current density that is drawn from or delivered to a HESD determines whether the devices behave with battery characteristics or supercapacitor characteristics.

Each half cell includes at least one electrode. The term "electrode" as used herein refers to an electrically conductive high surface area material together with an electrolyte that is incorporated into the electrically conductive, high surface area material. The electrolyte includes one or more dissolved species that can exist in more than two redox states. Embodiments also include a separator that electronically separates the two electrodes, and thus separates the two half cells. The separator may be selectively permeable or semi-permeable, such that selected charge carriers (e.g., protons (H+), sodium ions, potassium ions, sulphate ions, chloride, etc.) can pass through the separator. In addition, ions of the one or more dissolved species may also pass through the separator from one half cell to the other half cell. Thus, the electrodes/electrolytes of the half cells are ionically connected through the separator. Initially, upon preparation of a HESD, the electrodes of the half cells have substantially the same complement of dissolved species, i.e., substantially the same dissolved species that can exist in more than two redox states. However, as a result of applying a charge (i.e., an electrical potential difference) to the HESD, different redox pairs of the dissolved species are established in the two half cells; that is, a redox pair of a first half cell is different from a redox pair of a second half cell. The electrode where oxidation takes place is the anode. The electrode where reduction takes place is the cathode. Thus, two different half cells with different potentials are established. The difference in potential (i.e., cell potential, voltage) can be used to drive/enable faradaic reactions.

The electrically conductive high surface area material of the electrodes may be, or may include, a material such as, but not limited to, graphene, graphene nanoplatelets, reduced graphene oxide (rGO), micro porous carbon, activated carbon, or any combination thereof. Some embodiments may include graphene oxide (GO) in trace amounts, i.e., in very low concentrations (e.g., less than 1 wt %, or less than 5 wt %) as may result from impurities and/or the imperfect reduction/conversion of GO to rGO wherein small numbers of surface oxygen groups may remain on a GO sheet. However, the presence of trace amounts of GO may degrade performance and accordingly they should be minimized or avoided. The two electrodes of a pair of half cells may each be made of the same electrically conductive high surface area material. In some embodiments the electrically conductive high surface area material may be flexible. In some embodiments the electrically conductive high surface area material may be a gel. In one embodiment the electrically conductive high surface area material may be an activated carbon/foam. Such material may be immersed in (or otherwise loaded with) liquid electrolyte to provide a bulk electrode.

As noted above, the electrolyte includes a dissolved (i.e., electroactive) species that can be present in more than two redox states (i.e., $X^{n-1}$, $X^n$, $X^{n+1}$, $X^{n+2}$), and that can participate in electrical double layer (EDL) formation as described below. An example of such a dissolved species is vanadium. Examples of vanadium ions wherein vanadium is in different oxidation states include $V^{2+}$ for V(II), $V^{3+}$ for V(III), $VO^{2+}$ for V(IV), and $VO_2^+$ for V(V). Examples of redox pairs include: V(IV) and V(V); V(III) and V(IV); V(III) and V(V); V(II) and V(III); V(II) and V(IV); and V(II) and V(V). In one embodiment in which vanadium is used, prior to charging the HESD, the vanadium may initially be present in the electrolyte in one oxidation state, such as vanadium (IV). An example of an ion that includes V(IV) is $VO^{2+}$. A salt that dissolves to provide this ion is, for example, $VOSO_4$. After charging the HESD, the vanadium may be present in the electrolyte in more than two redox states, including V(II), V(III), V(IV), and V(V). In one embodiment, after charging, the vanadium in the electrolyte may be present in three different redox states, such as V(III), V(IV), and V(V). In one embodiment, after charging the HESD, the redox pair at one of the electrodes is V(IV)/V(V), and at the other electrode the redox pair is V(III)/V(IV). In another embodiment, after charging, the redox pair at one electrode is V(IV)/V(V) and the redox pair at the other electrode is V(III)/V(II). In another embodiment, prior to charging the HESD, the vanadium may initially be present in the electrolyte as V(III). After charging the HESD, the redox pair at one electrode is V(II)/V(III), and at the other electrode is V(III)/V(IV).

Figure 1A:
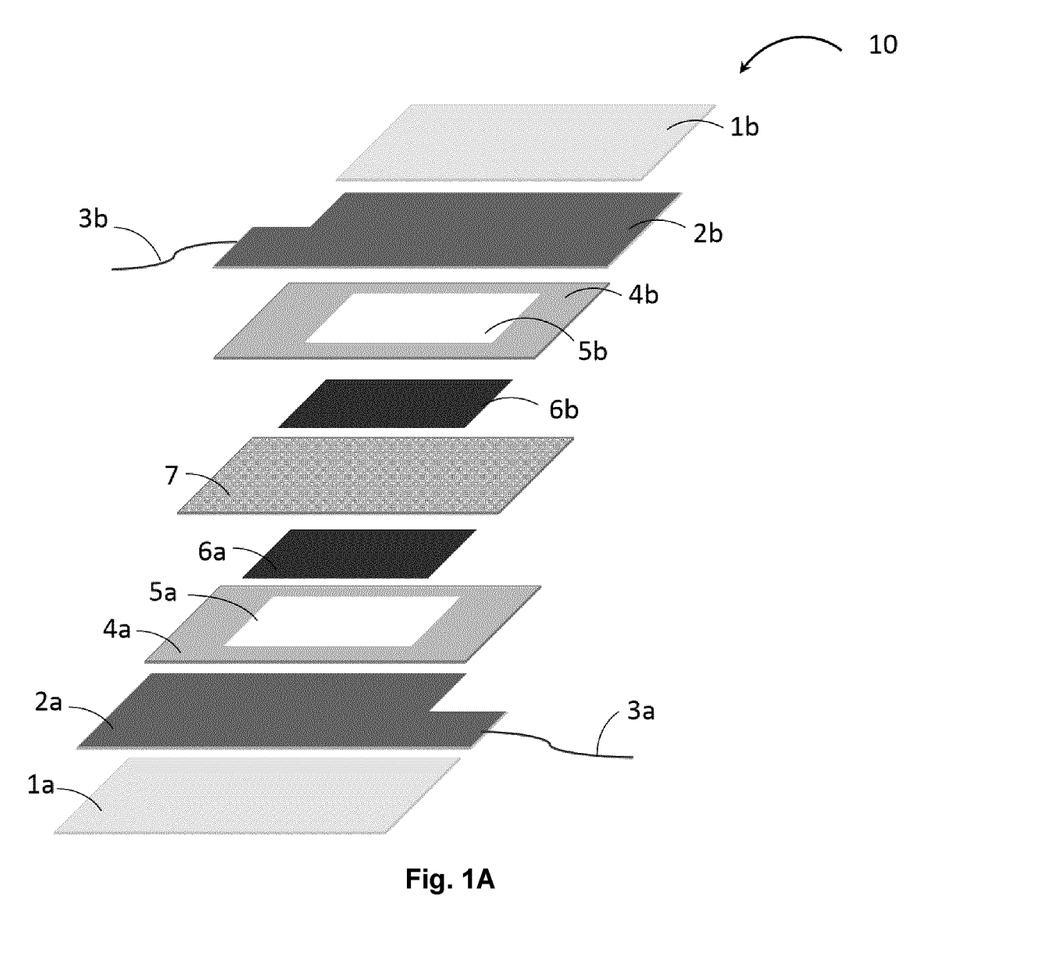
FIG. 1A is a diagram showing an exploded view of a hybrid energy storage device, according to one embodiment.

An exploded view of a generalized embodiment of a single cell HESD is shown in FIG. 1A. Referring to FIG. 1A, a cell has non-electrically conductive outer walls 1a, 1b, made of any suitable material such as a polymer, selected to provide desired characteristics of strength, weight, flexibility/rigidity, etc. Current collectors 2a, 2b are disposed inside the outer walls. The current collectors may be a carbon-based material such as carbon cloth. Electrical connections 3a, 3b to an external circuit are made via the current collectors 2a, 2b. Layers 4a, 4b are disposed against the current collectors and are made of a polymer material which may be selected for appropriate characteristics such as ruggedness and heat resistance, such as, for example, polyimide. The layers 4a, 4b, which may function as gaskets, are adapted to accept and contain the electrically conductive high surface area material together with electrolyte 6a, 6b. For example, one or more cavity 5a, 5b may be provided in each of the layers to accept and contain the electrically conductive high surface area material together with electrolyte 6a, 6b. A separator 7 disposed between the two sets of layers separates the two half cells. In some embodiments, all layers may be flexible and accordingly a flexible HESD may be prepared.

As noted above, the embodiment shown in FIG. 1A is a single cell. A hybrid storage device having a selected output voltage and current rating may be prepared by combining two or more cells in a series, parallel, or series-parallel configuration.

Figure 1B:
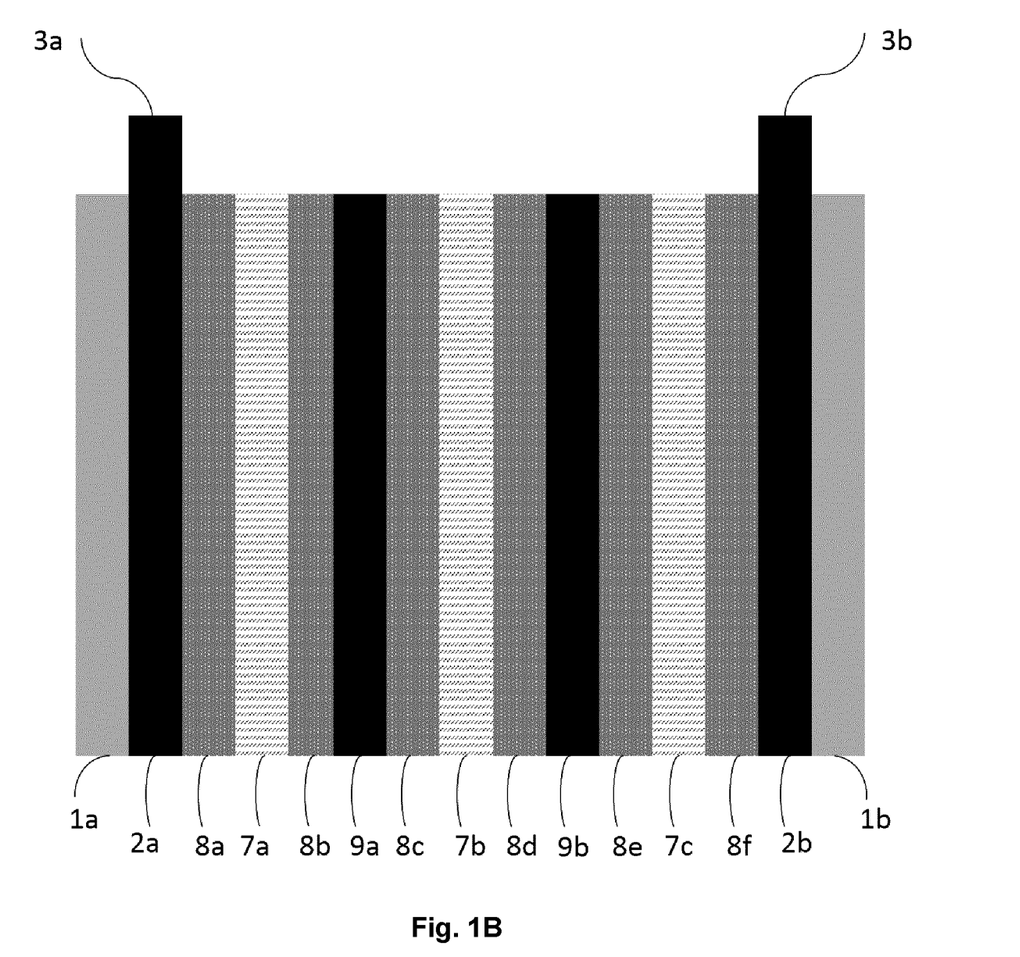
FIG. 1B is a diagram showing a stacked arrangement of hybrid energy storage device cells, according to one embodiment.

Output voltage of a HESD may also be increased by assembling a stack of several cells. Such an embodiment is shown in FIG. 1B. As in the embodiment of FIG. 1A, the device has outer walls 1a, 1b, and current collectors 2a, 2b with electrical connections 3a, 3b to an external circuit. In this embodiment three pairs of polymer layers together with electrode (i.e., electrically conductive high surface area material together with electrolyte) pairs 8a-8b, 8c-8d, and 8e-8f, with respective separators 7a, 7b, and 7c, are arranged in series as three cells, separated by two bipolar plates 9a, 9b. The bipolar plates may be, for example, carbon cloth, carbon paper, or metal (e.g., titanium) conductive sheet. In this embodiment, electrons travel through the bipolar plates to the adjacent cell. Thus, for one electron flowing through the external electrical circuit, several redox reactions take place leading to higher output voltage of the device.

A HESD as described herein benefits from a charge storage mechanism that stems from formation of an electrical double layer (EDL) at an interface within the electrodes (at the interface of the electrically conductive high surface area material and the electrolyte), as well as from redox reactions of the dissolved species. An electrochemical reaction of the redox pairs occurs at each electrode, and both educt (i.e., reactant) and product are dissolved in the electrolyte, that is, there is substantially no deposition of the dissolved species on the electrically conductive high surface area material. As a result, there is substantially no structural change in the electrodes during charge/discharge cycles, such that the embodiments have good cyclic stability.

Results described below show that a HESD as described herein has high power density, high charge content, and high durability. HESDs employing an electrolyte with a dissolved species having multiple oxidation state capability offer several advantages. Firstly, the electrically conductive high surface area material enables a high ionic redox species content that leads to a very high capacitance of the electrical double layer at the electrodes. Secondly, utilization of ion species that have more than two redox states simplifies manufacturing, since the same fabrication protocol may be used for both electrodes (i.e., both half cells). Also, the difference between the half cells that results from charging provides a cell potential difference which increases the energy content and power density of the cell. Embodiments described here exhibit a higher specific capacity (i.e., capacity in ampere-hours per mass, e.g., mAh $g^{-1}$) compared to other reported graphene supercapacitors. For example, as described in the Examples and figures herein, a high specific capacity (e.g., ~200 mAh $g^{-1}$ at a gravimetric current density of 1 A $g^{-1}$) was achieved. Embodiments also feature unique power-handling characteristics which means that they are useful in a wide range of applications. Further, in case of (unwanted) ions migration between the half cells, the cell can be easily regenerated by charging since the electrolytes of the half cells, despite the different oxidation states, are made from the same redox species.

A HESD as described herein has several advantages over prior designs. For example, a HESD may be less susceptible to damage by overcharging due to the use of a single redox species (e.g., vanadium). In one embodiment, when the device is charging, V(IV) is converted to V(III). In this situation, there is extra capacity for charging after the V(IV) is depleted, since it is possible to then have some or all of the V(III) converted to V(II). In contrast, power storage devices that use two different redox species are more vulnerable to damage by overcharging.

The battery-like character of the device has certain advantages. Initially (i.e., prior to charging), the prepared cell has an open circuit voltage (OCV) of about 0 V since it consists of two equal half cells having the same concentration of vanadium ions, $VO^{2+}$. During charging, $VO^{2+}$ ions are oxidized to $VO_2^+$ at the positive electrode. This reaction generates protons which migrate through the separator to the other half cell. At the negative electrode, the $VO^{2+}$ ions are reduced to $V^{3+}$. Thus, the two half cells have different Galvanic potentials resulting in a standard reversible cell potential of about 0.67 V. 0.67 V is the OCV for a half-charged redox battery (state of charge=0.5), which increases the more the device is charged. At about 0.9 V, all V(IV) will have been converted. It should be noted that the OCV of the device may increase beyond 0.9 V due to the high electrochemical double layer capacitance of the high surface area material together with an electrolyte. In one embodiment, V(III) is subsequently converted to V(II), which provides an even a higher OCV.

The main redox reaction in both half cells is presented below in equations (1) and (2):

Positive side:

$$VO^{2+}(aq)+H_2O(l) \leftrightarrows VO_2^+(aq)+2H^+(aq)+e^- \quad (1)$$

Negative Side:

$$VO^{2+}(aq)+2H^+(aq)+e^- \leftrightarrows V^{3+}(aq)+H_2O \quad (2)$$

The rate of the aforementioned reactions is limited by the diffusion of vanadium ions from the bulk of the electrolyte to the surface of the high surface area material (electrodes) in the form of a mass transfer polarization (overpotential). The HESD system may be modeled as a multiple reaction system which is the combination of EDL formation at the surface of the high surface area material and redox activity of the electrolyte. In such a system, the dominant reaction depends on the current load. In detail, at relatively high current densities, the EDL formation on the surface of high surface area material prevails over the faradaic reactions and the performance of the device becomes closer to that of an electrical double layer supercapacitor. This change is mainly due to the characteristically fast mechanism of the EDL which does not involve electron transfer from the high surface area material to electrolyte, or vice versa. At lower current densities, the effect of mass transfer and activation polarization are alleviated allowing the redox reactions to take place, leading to the higher capacity of the device. This hybrid performance not only increases the capacity of the device but also gives a wide range of power handling. For example, in preliminary tests a high capacity of about 200 mAh g$^{-1}$ (normalized by dried mass of electrode) at a current density of 1 A g$^{-1}$ was obtained. This capacity is comparable to that of lithium and sodium based cells at relatively low current densities (Kim, S. W., et al., *Adv. Energy Mater.* (2012). doi:10.1002/aenm.201200026).

Positive and negative sides of the device (i.e., the half cells) are electronically separated by the separator (e.g., an ion exchange membrane). The separator may minimize or prevent shuttling of the dissolved redox species, e.g., vanadium ions. For example, redox pairs in one half cell may be V(III)/V(IV) and in the other half cell may be V(IV)/V(V). The half cells then have a difference in Galvani (electrochemical) potentials and therefore the cell has a voltage which does not result solely from supercapacitor charging. Even when the supercapacitor is discharged, this voltage remains until it is depleted by faradaic reactions. Thus, HESDs as described herein offer high energy and power density relative to previously-known energy storage devices. This improvement maybe due to the existence of a potential plateau on the discharge curve at higher cell voltage range values which increases the energy and power density of the device.

Preliminary studies of an embodiment indicated that when the current density was increased from 1 A g$^{-1}$ to 5 A g$^{-1}$, the capacity dropped to around 46 mAh g$^{-1}$. This change corresponds to an equivalent specific capacitance of about 277 F g$^{-1}$. This double layer capacitance is significantly higher than the 130 F g$^{-1}$ which was reported for conventional hydrothermally reduced graphene oxide gels (Y. Xu, et al., *ACS Nano.* (2013) doi:10.1021/nn4000836). The high capacitance leads to a very high area-specific capacitance of about 915 mF cm$^{-2}$ at a current density of 5 A g$^{-1}$. It is noted that the specific capacitance definition should not be applied to a HESD for discharge profiles at relatively low current densities. In fact, the existence of the plateau-like potential is related to the redox reaction and would give an overestimation of the capacitance at low current densities. Studies showed that columbic efficiency (i.e, the ratio of discharge to charge in a charge-discharge cycle) increased with current density. This observation is in contrast to the general behavior of conventional electrochemical cells, i.e., electrochemical cells that utilize faradaic reactions, such as batteries and fuel cells. In principle, the efficiency and capacity of an electrochemical cell drops as the current density increases due to the internal cell resistance and kinetic overpotential. However, in a vanadium-graphene embodiment described herein, a strong efficiency improvement from 84% to 92% was observed when the current density increased from 0.5 A g$^{-1}$ to 1 A g$^{-1}$. For higher current densities, the device efficiency still increased, but the amount of increase was less. This observation can be attributed to the more capacitor-like behavior of the device at higher current densities.

The following working examples further illustrate the invention and are not intended to be limiting in any respect.

Example 1A. Synthesis of Electrically Conductive (EC) Gel Using rGO and V(IV)

An EC gel was synthesized via a hydrothermal reduction of a homogenous mixture of dispersed GO (16 mg mL$^{-1}$) and vanadyl sulfate solution (2 M). In detail, 50.6 g vanadyl sulfate powder (VOSO$_4$.XH$_2$O) was dissolved in 100 mL of a 2 M sulfuric acid, which was a supporting electrolyte, by sonication at 50° C. to make a VO$^{2+}$ electrolyte solution comprising 2 M of vanadium ions VO$^{2+}$. Simultaneously, an aqueous dispersion of GO (80 mL of 4 mg/mL 4 mg mL$^{-1}$) (available from Graphenea, Cambridge, Mass., USA) was concentrated (to 20 mL of 16 mg/mL) by evaporating it on a hot plate while the dispersion was stirred. Then, 20 mL of the concentrated dispersion was mixed with 5 mL of the VO$^{2+}$-electrolyte solution by combining them and vigorously stirring using a magnetic stir bar for 5 minutes. The resulting solution was transferred into a Teflon-lined autoclave for a hydrothermal reduction of GO to rGO, at 180° C. and 16 hr. The autoclave was cooled down to room temperature, and the graphene EC gel was removed using tweezers.

Figure 2A:
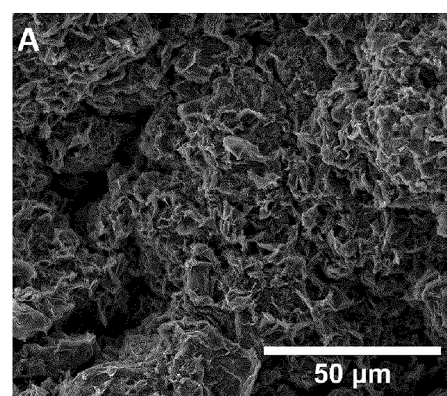
FIGS. 2A-2C are SEM images of dried hydrothermally reduced graphene oxide (GO) with incorporated vanadium electrolyte at specified magnification.
Figure 2B:
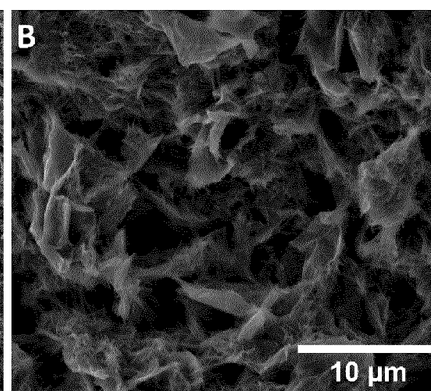
Figure 2C:
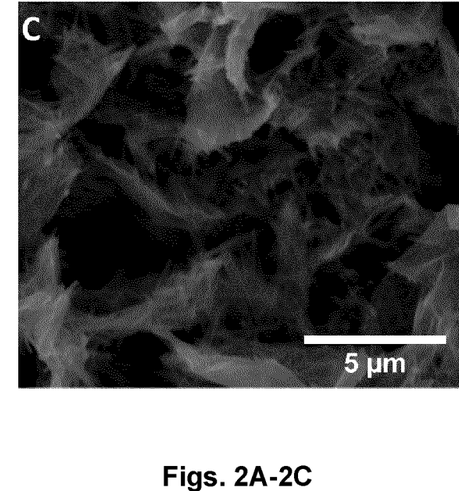

Dried samples of EC gels were investigated morphologically using scanning electron microscopy (SEM). Prior to drying, samples were rinsed with DI water to remove excess electrolyte at the surface of the EC gel. Since the EC gel encapsulates an acidic solution, it was decided not to freeze dry the samples since doing so may damage the instrument. Therefore, samples were dried at 60° C. in a convection oven until each sample's mass was constant. This temperature was used to maintain the water evaporation at a relatively slow rate, otherwise the sample's volume shrinks significantly. This shrinking results in parallel restacking of graphene sheet due to van der Waals forces which considerably decreases the volume and active surface area of the gel matrix. Scanning electron microscopy was performed at different magnifications (see FIGS. 2A-2C). These images revealed that the dried EC gel had an interconnected 3D macro-porous network consisting of porous walls sheets and primary pores with pore sizes ranging from sub-micrometers to several micrometers. The larger magnifications (see FIGS. 2B and 2C) indicated that porous walls were composed of ultra-thin layers of stacked reduced graphene.

Figure 3:
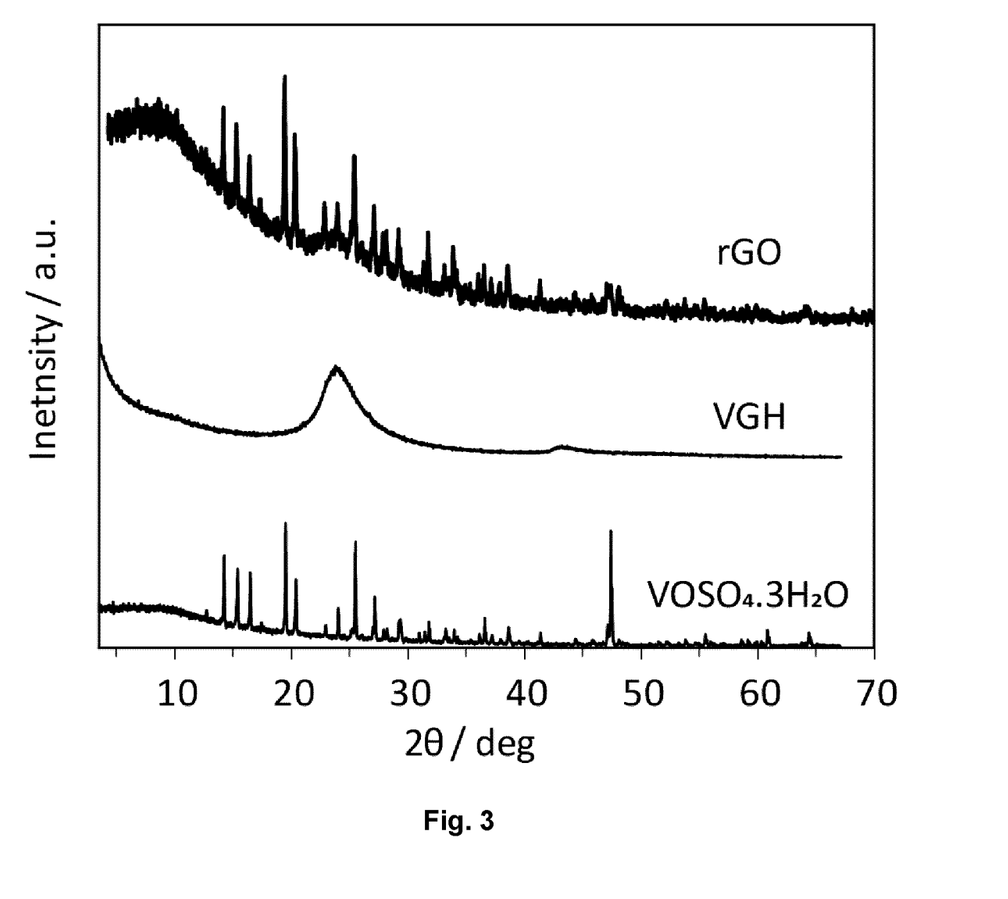
FIG. 3 is a plot showing X-ray diffraction (XRD) patterns of dried hydrothermally reduced GO with incorporated vanadium electrolyte, pristine vanadyl sulfate powder, and hydrothermally reduced pure GO dispersion.

X-ray diffraction (XRD) spectra of rGO, $VOSO_4 \cdot XH_2O$, and dried EC gel (using Cu-Kα, λ=1.542 A) are shown in FIG. 3. With respect to rGO, a broad diffraction peak was observed at 2θ=23.71° indicating the existence of π-π stacking between the graphene layers. The peaks of pristine vanadyl sulfate powder correspond to standard patterns for $VOSO_4 \cdot 3H_2O$. The XRD patterns of dried EC gel showed peaks of rGO and $VOSO_4 \cdot 3H_2O$, and exhibited characteristic diffraction patterns of both materials. The absence of the broad peak of rGO was attributed to a large amount of vanadyl sulfate salts in the sample; consequently, the peaks overlapped. That is, the rGO diffraction pattern increases the intensity of peaks related to $VOSO_4 \cdot 3H_2O$ for scattering angles below 2θ=30°. Dried EC gel patterns suggested recovery of π-conjugated systems of a mixture of GO and vanadium electrolyte during the hydrothermal reduction process. Interestingly, the sharp peaks confirmed a significant encapsulation of vanadium electrolyte thanks to residual hydrophilic oxygenated functional groups of GO. The as-prepared EC gel contained 96.4 wt. % of 0.4 M vanadium electrolyte.

Example 1B. Synthesis of Other Electrically Conductive (EC) Gels

Stable graphene nanoplatelets (GNP) solutions were formulated by adding small amounts of graphene oxide (GO) as a dispersant. The concentration of GNP may be greater than or equal to about 90 wt %, based on the total weight of solids (i.e., combined weight of both GNP and GO). Stable dispersions were observed up to about 15 wt % based on the total weight of the dispersion (solid and liquid weight). Stable GNP dispersions were prepared by adding GNP powder into a stable aqueous suspension of graphene oxide, followed by vigorous stirring for a few hours and sonication for 15 mins. The stable aqueous GNP dispersions may be used for synthesizing GNP EC gels.

A GNP and vanadium EC gel may be prepared by mixing a concentrated dispersion of GNP (and trace GO) (20 mL) with 5 mL of $VO^{2+}$ electrolyte solution (as prepared in Example 1A) and 0.8 g ascorbic acid. The solution was vigorously stirred using a magnetic stir bar for 5 minutes, transferred to a glass vial with a tight cap, and thermally treated a preheated oven at 95° C. for one hour. A sponge-like cylindrical shaped GNP EC gel was obtained.

Example 2. Preparation of a Flexible HESD

A flexible HESD based on the structure shown in FIG. 1A was built and tested. To prepare the device, two pieces (5×4 cm$^2$) of carbon cloth (Fuel Cell Store, College Station, Tex., USA) were used as current collectors. Polyimide sheets with a thickness of ~182 microns, having a square-shaped cavity (3×4 cm) that defined a foot print area of each electrode-electrolyte, were arranged on top of the current collectors.

The EC gel of Example 1 was cut into slices (approximately 5 mm×10 mm×0.5 mm including some for filling material), having a (dried) weight of ~4 mg. The slices were placed in the square-shaped cavities and pressed on the carbon cloth to squeeze out excess electrolyte. Such an electrode arrangement had a specific mass of around 3.3 mg cm$^{-2}$ based on the dried mass of electrode.

The HESD was assembled by stacking the two electrodes with NEOSEPTA CMS® ion exchange membrane (manufactured by Astom Corp, available from Amerida, Sommerset, N.J., USA) in between them to prevent electronic contact while providing ionic conductivity. To prevent desiccation of the hybrid power sources, the entire arrangement was sealed with PARAFILM®. The resulting HESD was robust and highly flexible.

Example 3. Quantification of Electrochemical Performance

Figure 4:
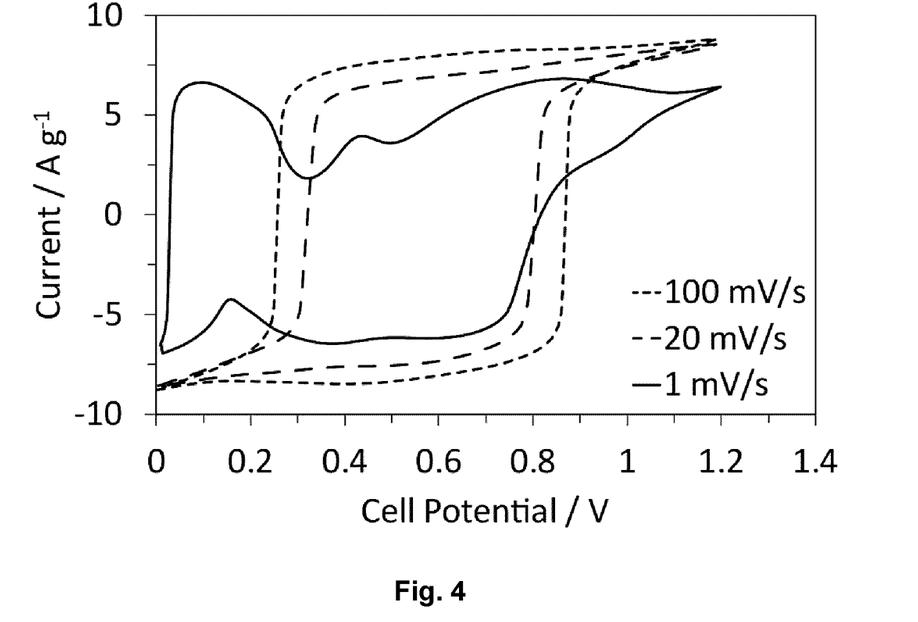
FIG. 4 is a cyclic voltammetry plot at different scan rates for a hybrid energy storage device according to one embodiment.

Electrochemical performance of the device of Example 2 was evaluated using cyclic voltammetry (CV), galvanostatic charge-discharge, and electrochemical impedance spectroscopy measurements. In general, the shape of the CV profile of supercapacitors and pseudo-supercapacitors are independent of the scan rates. This is also true of the all hybrid systems which were reviewed by Lee et al. (see J. Lee, et al., Prog. Mater. Sci. (2019). doi:10.1016/j.pmatsci.2018.10.005). FIG. 4 shows cyclic voltammograms (CV) of the device within a potential window of 0 to 1.2 V with scan rates ranging from 1 mV s$^{-1}$ to 100 mV Comparison of these CVs revealed that the characteristics of the device, in contrast to other hybrid devices, was governed by the scan rates. At relatively high scan rates, the performance of the device of Example 2 was close to an ideal electrical double-layer supercapacitor. That is, it showed supercapacitor-like behavior. It is known that a rectangular CV profile is distorted to an oblique angle in situations of considerable internal resistance. The even and regular rectangular CV profiles of FIG. 4 indicated that the device had low contact resistance between electrodes, membrane, and current collectors. Although not wishing to be bound by theory, the excellent capacitive performance of the device at high scan rates was attributed by the inventors to the intrinsically capacitive feature of the graphene-EC gel matrix. At relatively low scan rates, distinguishable redox peaks were observed in the CV, which became more pronounced as the scan rate decreased. For slow discharge, the HESD exhibited battery-like behavior. These redox peaks were associated with redox activity of the vanadium ions that were encapsulated inside the EC gel.

Figure 5:
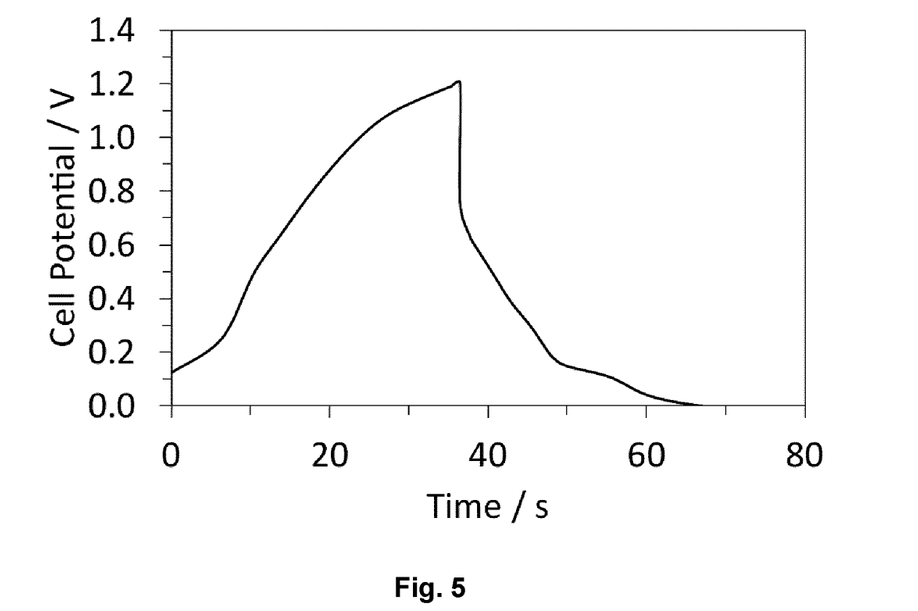
FIG. 5 is a galvanostatic charge-discharge curve at a current density of 5 A $g^{-1}$ for a hybrid energy storage device according to one embodiment.
Figure 6:
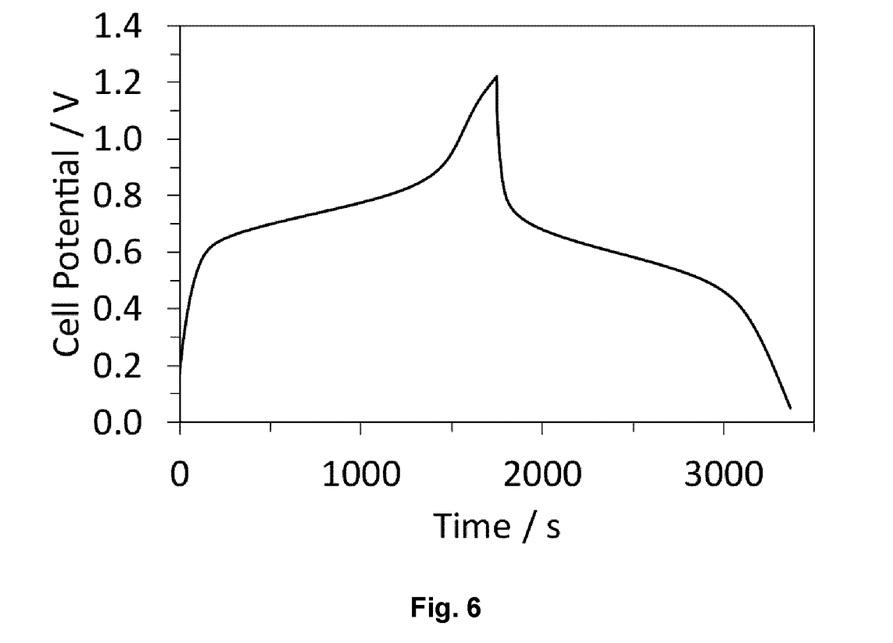
FIG. 6 is a galvanostatic charge-discharge curve at a current density of 0.5 A $g^{-1}$ for a hybrid energy storage device according to one embodiment.

The observation of such hybrid performance was supported by galvanostatic charge-discharge profiles which were recorded at different current densities. At a relatively high current density of 5 A g$^{-1}$ (see FIG. 5), the correlation between time (transferred charge) and voltage was rather linear. This linearity showed the supercapacitive performance of the system. However, the redox reactivity of the encapsulated electrolyte led to a more battery-like behavior when the HESD operated with lower current density such as with 0.5 A g$^{-1}$ (see FIG. 6).

Figure 7:
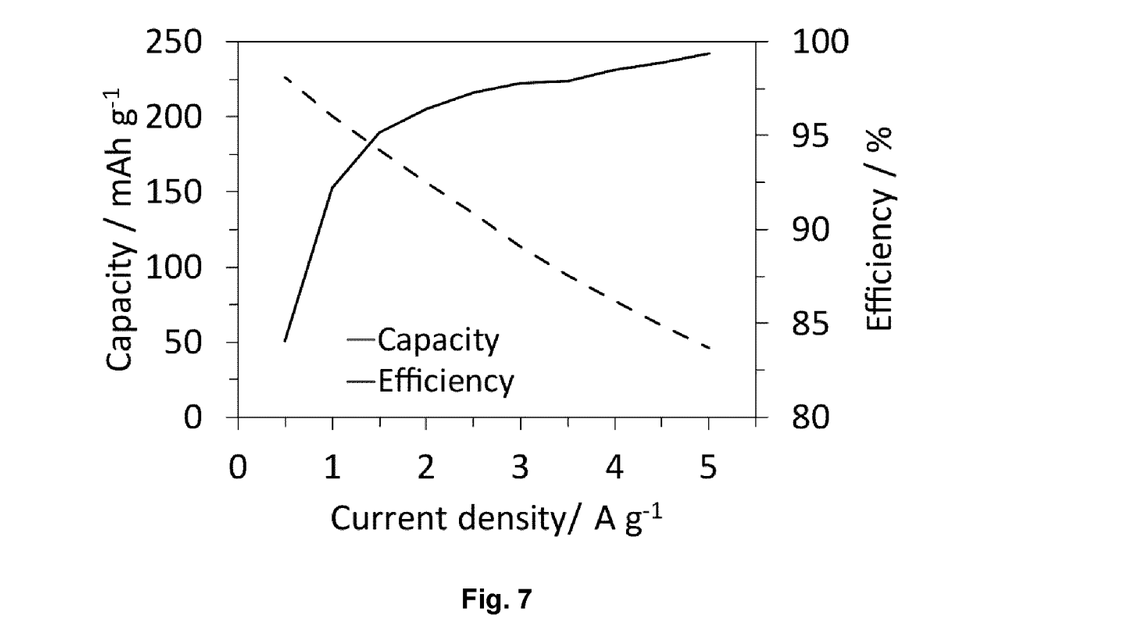
FIG. 7 is a plot of specific capacity and coulombic efficiency versus current density for a hybrid energy storage device according to one embodiment.

FIG. 7 shows a comparison of specific capacity and coulombic efficiency versus current density. Results show that the device efficiency increased with current density, which is consistent with supercapacitor behavior. In contrast, the capacity of the device decreased with increasing charging current.

Figure 8:
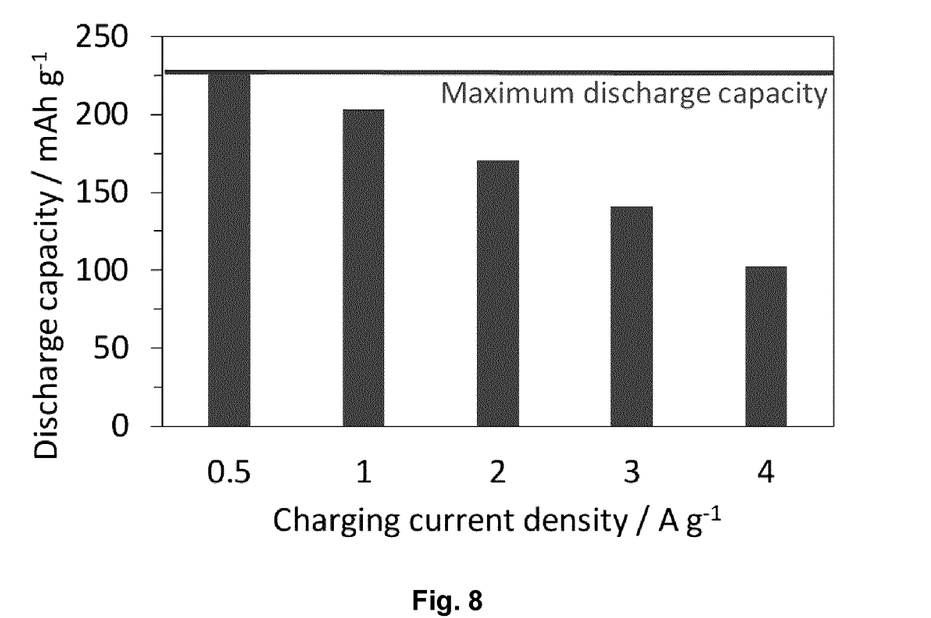
FIG. 8 shows delivered capacity of a hybrid energy storage device at current density of 0.5 A $g^{-1}$ after charging at different current densities, according to one embodiment.

FIG. 8 is a plot showing discharge capacity of the HESD at current density of 0.5 A g$^{-1}$ after charging at different current densities. The results demonstrate that the device can be quickly charged and slowly discharged. The device achieves a much higher capacity than prior graphene hydrogel supercapacitors, which are at about 30 mAh g$^{-1}$ for all charging currents, even at higher charge currents.

Figure 9:
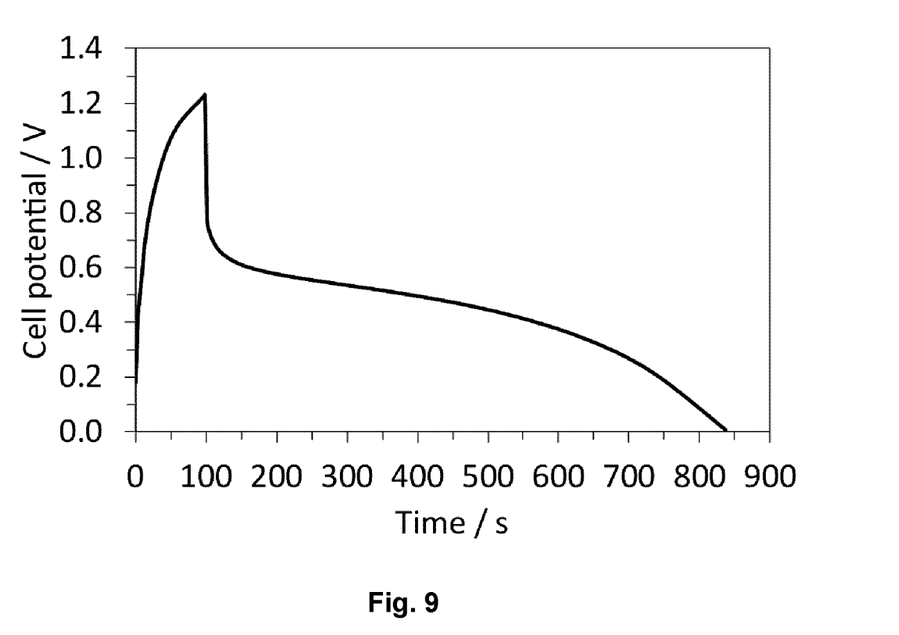
FIG. 9 is a hybrid energy storage device galvanostatic charge-discharge profile at charging current density of 4 A $g^{-1}$ and discharge current density of 0.5 A $g^{-1}$, according to one embodiment.

FIG. 9 shows a galvanostatic charge-discharge profile at charging current density of 4 A g$^{-1}$ and discharge current density of 0.5 A g$^{-1}$. As shown, the device was charged in a manner that is consistent with supercapacitor character, and then it was discharged with battery character. This dual character is apparent in the plots that show cell potential as a triangle-like shape, while discharging has a flatter shape which is consistent with constant discharge voltage. In contrast, a prior purely supercapacitor (without vanadium) delivered only approximately one-fifth of the amount of energy.

Example 4. Mechanical Stress Studies

Figure 10:
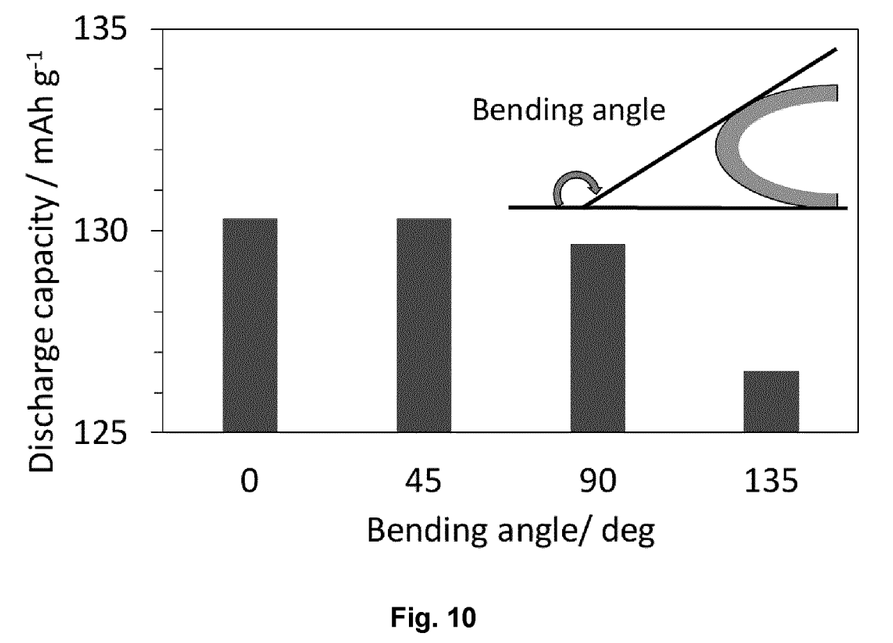
FIG. 10 is a plot showing hybrid energy storage device galvanostatic discharge capacity at a current density of 2.5 A $g^{-1}$ for different bending angles, and the inset shows how bending angle was measured, according to one embodiment.
Figure 11:
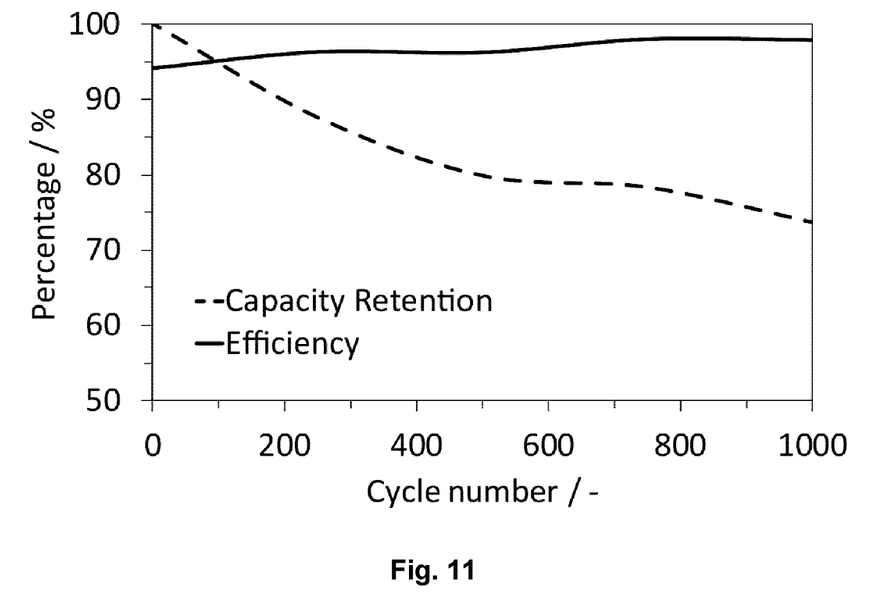
FIG. 11 is a plot showing cycling stability of a hybrid energy storage device at a current density of 2.5 A $g^{-1}$, according to one embodiment.
Figure 12:
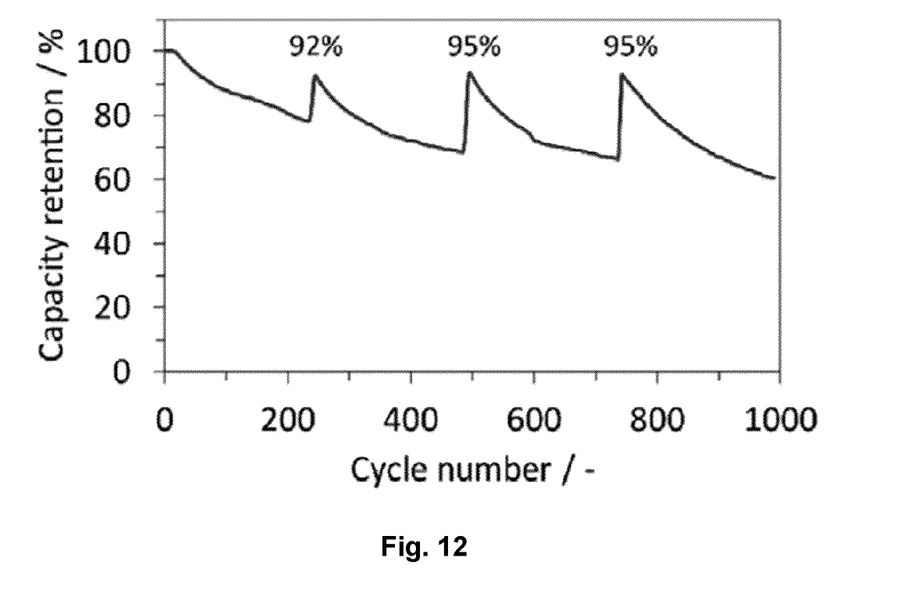
FIG. 12 is a plot showing capacity retention for an embodiment at a current density of 3.5 A $g^{-1}$ with restoring cycles after every 250 cycles.

The performance of a HESD under mechanical stress was also investigated at various bending angles by performing galvanostatic charge-discharge measurements at a current density of 2.5 A $g^{-1}$. Up to 90 degrees, there was no noticeable difference in capacity. Even at a bending angle of 135°, the HESD showed only a negligible capacity fading of around 3% (see FIG. 10), indicating the excellent integrity of the device under mechanical stress. Durability of the device was also evaluated by galvanostatic charge-discharge at a current density of 2.5 A $g^{-1}$ for 1000 cycles. FIG. 11 shows capacity retention and columbic efficiency over the charge-discharge cycle number. While the efficiency remained relatively constant, a 27% capacity decay was observed after 1000 cycles. This loss can be recovered and the device substantially or completely restored to the original condition by a slow charge and discharge restoring cycle, e.g., at a current density of about 0.5 A $g^{-1}$. For example, FIG. 12 shows capacity retention over 1,000 charge-discharge cycles at a current density of 3.5 A $g^{-1}$ with restoring cycles after every 250 cycles.

Example 5. Self-Discharge and Leakage Current Studies

Self-discharge characteristics and leakage current are important parameters for the practical application of electrochemical storage systems. Particularly, systems with redox electrolyte are expected to suffer from higher self-discharge rates originating from crossing-over of the ions, which is referred to as redox shuttling of the ions. Here, the leakage current of a HESD was measured using a current floating method at a cell potential of 1.2 V. In detail, the cell was firstly charged to cell potential of 1.2 V at a current density of 1 A $g^{-1}$. Afterwards, the cell potential was kept at 1.2 V for 2 h while the current response of the device was recorded. The floating current quickly dropped at the current density of 80 µA $mg^{-1}$ (mass per electrode) which compensates the leakage current throughout the device. The mass-based leakage current of the HESD was higher compared to those reported for graphene-EC gel based supercapacitors which are typically 1.5 µA per mg per electrode (Z. Wang, et al., RSC Adv. (2015) doi:10.1039/c4ra15494k). This higher value should be mainly associated with the vanadium redox couples. However, the encapsulated vanadium significantly increases the charge capacity storage of the device which is not taken into account of the mass-based leakage current definition. In order to make a more realistic comparison with other systems, it is better to report a leakage current normalized by the charge capacity of the device. The HESD had a leakage current of 4.1 µA $C^{-1}$ which was significantly lower compared to that reported for a hydrothermally reduced graphene-based supercapacitor (51.9 µA $C^{-1}$) (see Z. Wang, et al., RSC Adv. (2015) doi:10.1039/c4ra15494k) and a functionalized graphene-based supercapacitor using hydroquinone (15 µA $C^{-1}$) (see L. Wu, et al., Phys. Chem. Chem. Phys. 19 (2017) 14708-14717 doi: 10.1039/C7CP02581E).

Figure 13:
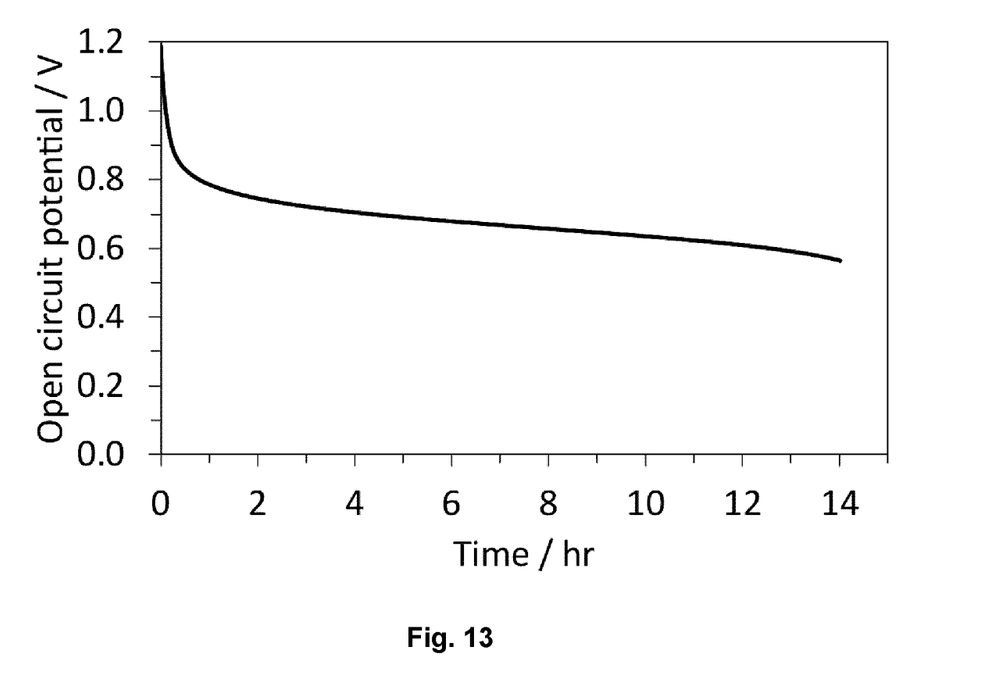
FIG. 13 is a self-discharge curve of a hybrid energy storage device after charging at 1.2 V for 15 minutes, according to one embodiment.

The self-discharge of the HESD was also investigated based on OCV measurements. The device was firstly charged at a current density of 0.5 A $g^{-1}$ to a cell potential of 1.2 V. Then the cell potential was kept at 1.2 V for 15 minutes and its changes were recorded as shown in FIG. 13. This figure demonstrates a rapid cell potential drop during the first hour followed by a moderate potential decay over the rest of experiment. After 14 h, the potential dropped to 0.57 V which was equal to 52% of potential fading. This rate of potential fading was significantly lower compared to those reported for a graphene-EC gel based supercapacitor with redox electrolyte of HQin $H_2SO_4$ (96% cell potential fading after 12 h) or SPANI in $H_2SO_4$ (79% cell potential fading after 12 h).

Example 6. Self Discharge Study

FIG. 13 shows self-discharging for an embodiment prepared according to Example 2, which demonstrates a rapid cell potential drop during the first hour followed by a moderate potential decay over the rest of experiment. After 14 h, the potential dropped to 0.57 V which is equal to 52% of potential fading. This rate of potential fading is significantly lower compared to those reported for graphene-hydrogel based supercapacitors without redox couple or with redox couple of HQin/Qin in $H_2SO_4$ (96% cell potential fading after 12 h) (Y. Xu, et al., Functionalized graphene hydrogel-based high-performance supercapacitors, Adv. Mater. (2013). doi:10.1002/adma.201301928) or sulfonated polyaniline (SPANI) in $H_2SO_4$ (79% cell potential fading after 12 h) (L. Chen, et al., Electrochemical supercapacitor with polymeric active electrolyte, J. Mater. Chem. A. 2 (2014) 10526-10531]. This lower rate of potential fading may be associated with partial recovery of the leakage current by vanadium ions through faradaic reactions which can be inferred from an increase in the state of charge of the electrolyte.

The state of charge of electrolyte may be generally described either as the ratio of $V^{3+}$ to all vanadium ions at the negative side or the ratio of $VO^{2+}$ to all vanadium ions at the positive side. More specifically, it may be described as the ratio of V(III) to V(IV) on the negative side or V(V) to V(IV) on the positive side.

During self-discharge of the device, it was observed that the state of charge of the electrolyte fluctuated, instead of steadily decreasing which is generally expected from a self-discharge process. In order to investigate this observation, multiple identical devices were made and connected in parallel followed by charging at 1.2 V for 2 hours. In such an arrangement, the devices share their characteristics and the overall performance would be close to one large equivalent device. After every half-hour, one device was disconnected and a negative half cell was removed to determine the state of charge of the electrolyte.

Figure 14:
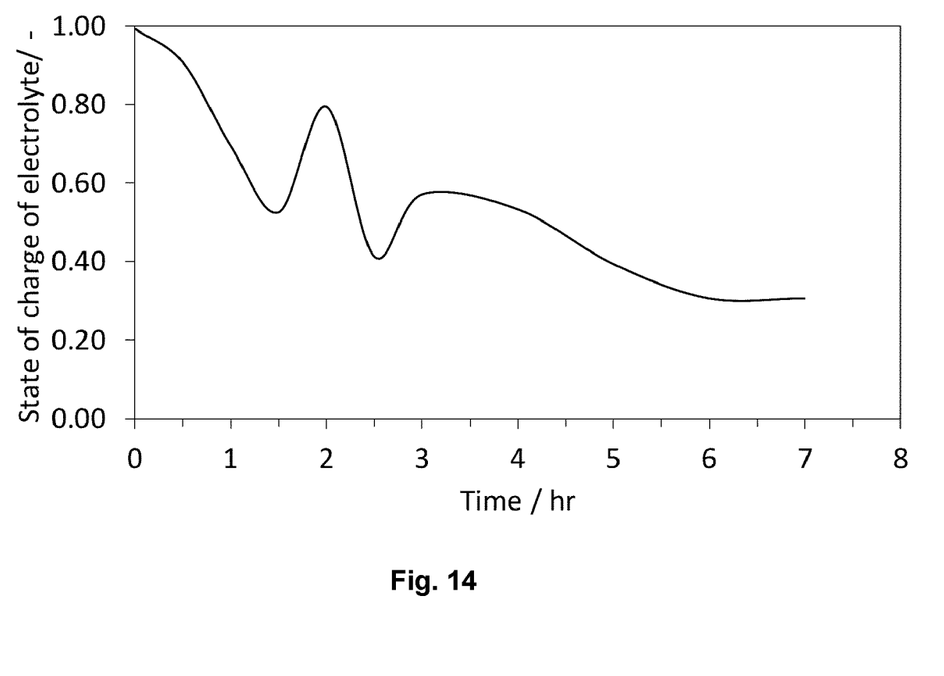
FIG. 14 is a plot showing rate of change of the state of charge of electrolyte of a hybrid energy storage device according to one embodiment.

Initially, the vanadium ions were extracted from the half cells by immersing in 4 ml of 5 M sulfuric acid solution. After 24 hours, the resultant solution was filtered to remove the rGO, and the concentration of $V^{3+}$ was determined using a UV-Vis spectrophotometer (Evolution 300, Thermo Fisher Scientific, Liverpool, N.Y., USA) at a wavelength of 400 nm. (FIG. 14). As the figure shows, the state of charge of the electrolyte decreased over the first 1.5 hours followed by an increase from 1.5-2 hours. The state of charge subsequently decreased from 2-2.5 hours and slightly increased from 2.5-3 hours.

The relative increase of state of charge may be attributed to the partial recovery of the leakage current through the conversion of $VO^{2+}$ to $V^{3+}$ at the negative side coupled with conversion of $VO^{2+}$ to $VO_2^+$ at the positive side. Here, it should be noted that the relative increase of $V^{3+}$ cannot be associated with the effects of ion crossover as this phenomenon can only decrease the state of charge. In fact, the contraction of ion redistribution and ion crossover with partial recovery of the leakage current leads to fluctuation of the state of charge. However, the longer self-discharge time (after 3 hours) only result in a further decrease of the state of charge. This may be due to the low over-potential at the electrodes which cannot provide a sufficient driving force for the faradaic reaction.

INCORPORATION BY REFERENCE

The contents of all cited publications are incorporated herein by reference in their entirety.

EQUIVALENTS

It will be understood by those skilled in the art that this description is made with reference to certain embodiments and that it is possible to make other embodiments employing the principles of the invention which fall within its scope.

The invention claimed is:

1. A hybrid energy storage device, comprising:
at least one cell;
wherein the at least one cell comprises two half cells, wherein each half cell comprises:
an electrode comprising an electrically conductive high surface area material and an electrolyte incorporated into the electrically conductive high surface area material, wherein the electrolyte comprises a dissolved species that can exist in more than two redox states;
the energy storage device further comprising:
at least one separator that electronically separates the two half cells and allows transfer of selected charge carriers between the half cells;
wherein a current density drawn from or delivered to the HESD determines whether the two half cells function as a battery, a supercapacitor, or a battery-supercapacitor.

2. The hybrid energy storage device of claim 1, wherein each half cell has a redox pair of the dissolved species, and the redox pair of one electrode is different than the redox pair of the other electrode.

3. The hybrid energy storage device of claim 1, wherein the energy storage device is flexible and a capacity of the hybrid energy storage device is substantially maintained at a bending angle up to at least 135 degrees.

4. The hybrid energy storage device of claim 1, wherein the electrically conductive high surface area material comprises graphene, graphene nanoplatelets, reduced graphene oxide (rGO), microporous carbon, activated carbon, or a combination of two or more thereof.

5. The hybrid energy storage device of claim 4, further comprising a trace amount of graphene oxide.

6. The hybrid energy storage device of claim 1, wherein the dissolved species that can exist in more than two redox states is vanadium.

7. The hybrid energy storage device of claim 6, wherein the more than two redox states are vanadium (II), vanadium (III), vanadium (IV), and vanadium (V).

8. The hybrid energy storage device of claim 2, wherein the redox pair of the dissolved species associated with one electrode is V(IV)/V(V) and the redox pair associated with the other electrode is V(III)/V(IV).

9. The hybrid energy storage device of claim 2, wherein the redox pair of the dissolved species associated with one electrode is V(IV)/V(V) and the redox pair associated with the other electrode is V(II)/V(III).

10. The hybrid energy storage device of claim 2, wherein the redox pair of the dissolved species associated with one electrode is V(II)/V(III), and the redox pair associated with the other electrode is V(III)/V(IV).

11. The hybrid energy storage device of claim 1, wherein the at least one separator is an ion exchange membrane.

12. A method for storing energy, comprising connecting the hybrid energy storage device of claim 1 to a source of electrical energy and storing electrical energy in the hybrid energy storage device.

13. A method for preparing a hybrid energy storage device, comprising:
providing at least one cell, wherein the at least one cell comprises two half cells;
wherein each half cell comprises an electrode comprising an electrically conductive high surface area material and an electrolyte incorporated into the electrically conductive high surface area material, wherein the electrolyte comprises a dissolved species that can exist in more than two redox states;
electronically separating the two half cells using at least one separator;
wherein the at least one separator allows transfer of selected charge carriers between the half cells;
wherein a current density drawn from or delivered to the HESD determines whether the two half cells function as a battery, a supercapacitor, or a battery-supercapacitor.

14. The method of claim 13, further comprising applying a suitable potential difference across the electrodes of the two half cells;
wherein the potential difference establishes a different redox pair of the dissolved species in each of the two half cells.

15. The method of claim 13, wherein the energy storage device is flexible and a capacity of the hybrid energy storage device is substantially maintained at a bending angle up to at least 135 degrees.

16. The method of claim 13, wherein the electrically conductive high surface area material comprises graphene, graphene nanoplatelets, reduced graphene oxide (rGO), microporous carbon, activated carbon, or a combination of two or more thereof.

17. The method of claim 16, further comprising a trace amount of graphene oxide.

18. The method of claim 13, wherein the dissolved species that can exist in more than two redox states is vanadium.

19. The method of claim 18, wherein the more than two redox states are vanadium (II), vanadium (III), vanadium (IV), and vanadium (V).

20. The method of claim 14, wherein the redox pair of the dissolved species associated with one electrode is V(IV)/V(V) and the redox pair associated with the other electrode is V(III)/V(IV).

21. The method of claim 14, wherein the redox pair of the dissolved species associated with one electrode is V(IV)/V(V) and the redox pair associated with the other electrode is V(II)/V(III).

22. The method of claim 14, wherein the redox pair of the dissolved species associated with one electrode is V(II)/V(III), and the redox pair associated with the other electrode is V(III)/V(IV).

23. The method of claim 13, wherein the at least one separator comprises an ion exchange membrane.

* * * * *